(12) United States Patent
Park

(10) Patent No.: US 8,689,680 B2
(45) Date of Patent: Apr. 8, 2014

(54) COOKWARE THAT FUNCTIONS AS A LOW PRESSURE COOKER

(76) Inventor: Jong Peter Park, Pasadena, CA (US)

( * ) Notice: Subject to any disclaimer, the term of this patent is extended or adjusted under 35 U.S.C. 154(b) by 273 days.

(21) Appl. No.: 12/939,881

(22) Filed: Nov. 4, 2010

(65) Prior Publication Data

US 2012/0085243 A1    Apr. 12, 2012

(30) Foreign Application Priority Data

Oct. 7, 2010   (KR) .................. 10-2010-0097768

(51) Int. Cl.
*A47J 27/09*    (2006.01)

(52) U.S. Cl.
USPC ............ 99/337; 99/403; 220/573.4; 126/274; 126/29

(58) Field of Classification Search
USPC ............... 99/325, 403, 422, 337, 646 C; 126/375.1, 390.1, 373.1; 220/573.1, 220/573.4, 912; 219/440
See application file for complete search history.

(56) References Cited

U.S. PATENT DOCUMENTS

| | | | | |
|---|---|---|---|---|
| 1,681,150 A | * | 8/1928 | Vischer, Jr. ................ | 220/240 |
| 2,441,131 A | * | 5/1948 | Blackman et al. .......... | 220/315 |
| 2,622,591 A | * | 12/1952 | Bramberry, Jr. ........... | 126/381.1 |
| 3,489,075 A | * | 1/1970 | O'Reilly .................... | 99/450 |
| 3,547,298 A | * | 12/1970 | Versluis ..................... | 220/582 |
| 3,721,363 A | * | 3/1973 | Bressler et al. ............ | 220/315 |
| 4,106,486 A | * | 8/1978 | Lee ............................ | 126/369 |
| 4,648,382 A | * | 3/1987 | Greenbacker .............. | 126/348 |
| 4,952,765 A | * | 8/1990 | Toyosawa ................... | 219/735 |
| 5,277,326 A | * | 1/1994 | Chiba ......................... | 220/231 |
| 6,191,393 B1 | * | 2/2001 | Park ........................... | 219/439 |
| 6,320,166 B1 | * | 11/2001 | Park ........................... | 219/439 |
| 6,467,645 B2 | * | 10/2002 | Park ........................... | 220/592.28 |
| 6,631,824 B2 | * | 10/2003 | Park ........................... | 220/740 |
| D487,212 S | * | 3/2004 | Park ........................... | D7/360 |
| 6,698,337 B1 | * | 3/2004 | Park ........................... | 99/342 |
| 7,086,326 B2 | * | 8/2006 | Yokoyama .................. | 99/413 |
| 7,905,226 B2 | * | 3/2011 | Scioscio ..................... | 126/390.1 |
| 8,393,262 B1 | * | 3/2013 | Molayem .................... | 99/337 |
| 2003/0209154 A1 | * | 11/2003 | Park ........................... | 99/403 |
| 2003/0209551 A1 | * | 11/2003 | Park ........................... | 220/573.1 |
| 2005/0205577 A1 | * | 9/2005 | Park ........................... | 220/367.1 |

(Continued)

FOREIGN PATENT DOCUMENTS

CN    201002790 Y   *   1/2008
CN    201665359 U   *   12/2010

(Continued)

*Primary Examiner* — Dana Ross
*Assistant Examiner* — John J Norton
(74) *Attorney, Agent, or Firm* — Heedong Chae; East West Law Group

(57) ABSTRACT

An eco green cookware is provided, having a double-layered wall structure and comprising a heat transfer medium within a cavity of the double-layered wall structure. The eco green cookware comprises: a container comprising an inner shell and an outer shell, wherein upper parts of the inner shell and outer shell are rolled a number of times together to form a rolled joint, an upper part of the inner shell is provided with a concave member, a heat transfer medium is provided within said cavity, a first heat transfer member is inserted and installed at the bottom portion of said cavity, and a second heat transfer member is affixed to the bottom surface of the first heat transfer member; an inner cover comprising an inner peripheral portion in the form of an inverted "L" whose inside bend forms a round portion; an outer cover; and pressure release devices.

8 Claims, 5 Drawing Sheets

(56) References Cited

U.S. PATENT DOCUMENTS

2005/0263015 A1* 12/2005 Mulgrew .................... 99/516
2006/0289538 A1* 12/2006 Hasegawa ................ 220/203.29
2007/0000915 A1* 1/2007 Cheng ......................... 219/621
2010/0199860 A1* 8/2010 Seitz et al. .................... 99/468

FOREIGN PATENT DOCUMENTS

| CN | 202229241 U | * | 5/2012 |
| DE | 19544717 A1 | * | 6/1997 |
| JP | 2000023828 A | * | 1/2000 |
| JP | 2004241177 A | * | 8/2004 |

* cited by examiner

COOKWARE THAT FUNCTIONS AS A LOW PRESSURE COOKER

TECHNICAL FIELD

The present invention relates to cookware, and more particularly, to eco green cookware having a double-layered wall structure and comprising a heat transfer medium within a cavity of the double-layered wall structure, wherein the cookware has a heat insulating property, thereby saving energy and preventing the food's nutrients from escaping.

BACKGROUND OF THE INVENTION

Various types of cooking vessels are known and used in a kitchen to cook food. Typical cooking apparatus such as a pan and a rice cooker are made of a single-layered stainless steel. The single-layered stainless steel is good for transferring heat fast, but has a disadvantage that food gets stuck to the cooking apparatus.

To solve the above problem, cooking vessels having a double-layered structure has been proposed.

Japanese Utility Model Laid-Open No. Sho56-169825 teaches a heating pot comprising an inner wall and an outer wall, wherein a closed space is provided therebetween, and a working fluid is injected, the working fluid vaporizing and moving by heating within the space, and condensing by cooling. Japanese Utility Model Laid-Open No. Sho63-48526 teaches a heat-insulated cooking apparatus, wherein a vacuum heat-insulated layer is formed in a container and in a side wall portion, and heat is transferred from a bottom portion, the container comprising the side wall portion and bottom portion.

However, such cooking vessels have the risk of explosion due to the pressure of substances between an inner wall and an outer wall.

Moreover, the typical cooking vessels have a problem that when cooking soup, soup within the vessels is leaked out so that vitamin is destroyed or escaping.

SUMMARY OF THE INVENTION

The present invention contrives to solve the disadvantages of the prior art.

Problems to be Solved

The present invention is designed to solve the above problems, and aims to provide cookware having a double-layered structure, thereby making cooking smoothly, having no risk of explosion while having a heat insulating property, and allowing to avoid vapor steam of the food from leaking out to prevent the food's nutrients from escaping.

Technical Means for Solving the Problems

In order to achieve the above object, the present invention provides eco green cookware comprising:

a container comprising an inner shell and an outer shell, wherein a cavity is provided between said inner shell and said outer shell, upper parts of the inner shell and outer shell are rolled a number of times together to form a rolled joint, which is subjected to electrical welding, an upper part of the inner shell is provided with a concave member, a heat transfer medium is provided within said cavity, a first heat transfer member is inserted and installed at the bottom portion of said cavity, and a second heat transfer member is affixed to the bottom surface of the first heat transfer member;

an inner cover comprising an inner peripheral portion in the form of an inverted "L" whose inside bend forms a round portion, wherein the inner peripheral portion is made of steel material surrounded by silicon rubber, and covers the upper surface of the concave portion of said inner shell to form moisture sealing;

an outer cover positioned above said inner cover; and pressure release devices for releasing the pressure within said cavity.

Also, the present invention provides eco green cookware characterized in that said heat transfer medium is silicon oil.

In addition, the present invention provides eco green cookware characterized in that said first heat transfer member and said second transfer member are made of aluminum or copper.

Moreover, the present invention provides eco green cookware characterized in that said pressure release device comprises a valve member with an elastic property, said valve member comprising a valve body in the form of a hollow cylinder, a valve neck, and a valve head, said valve neck extending to said valve body and having a smaller diameter than the valve body, and said valve head tapered forwardly, wherein said valve neck is inserted into a hole of the outer shell of said container.

Furthermore, the present invention provides eco green cookware characterized in that said pressure release device comprises a fixing member, an elastic member, and an elastic supporting member, said fixing member comprising a fixing body, a fixing head, and a fixing nut, said fixing member being hollow, wherein a hollow portion of said fixing body has a greater diameter than a hollow portion of said fixing head, and wherein said elastic member is provided within the hollow portion of said fixing body, said elastic member comprising an elastic body for performing elastic action and an elastic head for sealing the hollow portion of said fixing head at normal times, and said elastic supporting member being coupled to a screw of said body of said fixing member and supporting said elastic member, and having a hole at one end.

Effects of the Invention

The cookware according to the present invention has a heat insulating property, thereby improving flavor of the food and saving energy greatly, and thus the cookware is environment-friendly.

Also, according to the present invention, there is no risk of explosion, because it adopts a double-layered structure and a pressure release device.

In addition, the present invention allows avoiding vapor steam of the food from leaking out so as to prevent the food's nutrients such as flavor or vitamin from escaping outside.

Moreover, the present invention allows cooking the food automatically and slowly even after the heat source is removed and thus the cookware functions as a slow cooker.

Further, the present invention uses two lids, so that the cookware functions as a semi-pressure cooker.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

All the contents of U.S. Pat. No. 6,191,393 issued on Dec. 2, 2001, U.S. Pat. No. 6,467,645 issued Oct. 22, 2002, U.S. Pat. No. 6,631,824 issued on Oct. 14, 2003, U.S. Pat. No. 6,698,337 issued on Mar. 2, 2004, U.S. Design Pat. No. 486,352 issued on Feb. 10, 2004, U.S. Design Pat. No. 487,212 issued on Mar. 2, 2004, Korean Patent Publication No. 10-2005-0115981, US Patent Publication No. 2004/0094544, and US Patent Publication No. 2004/0118838, all by the inventor of the present application are incorporated herein by reference.

Hereinafter, the present invention will be described in detail with reference to the drawings.

Figure 1:
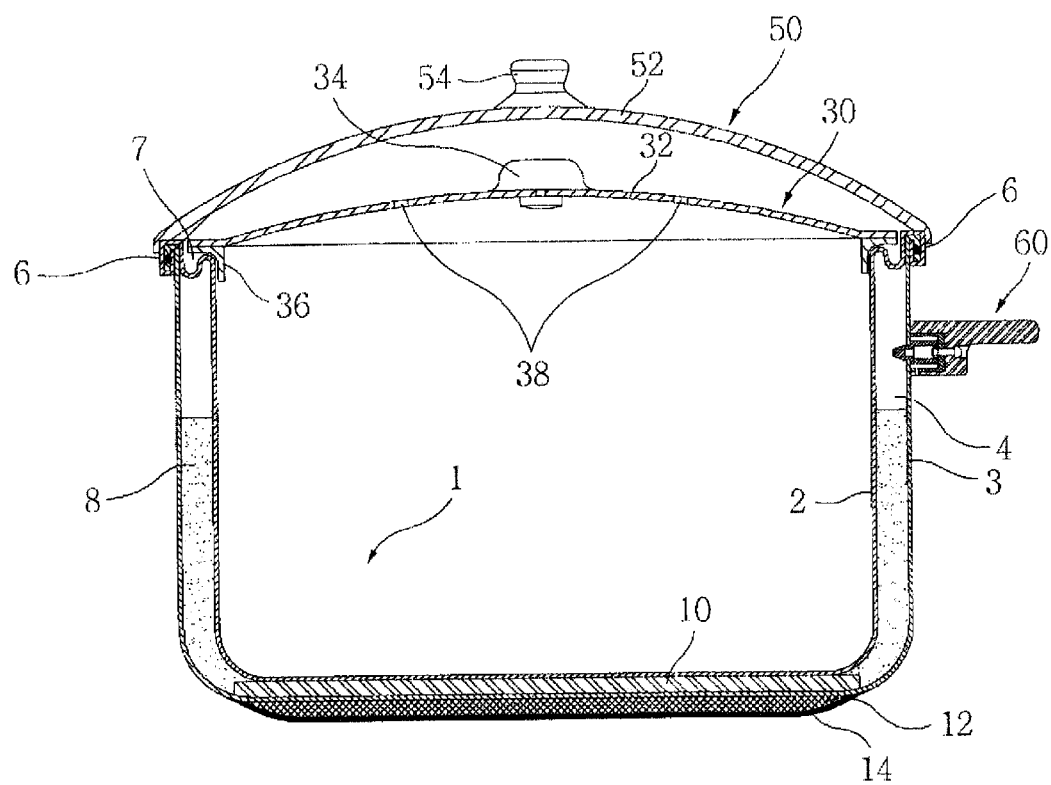
FIG. 1. shows a cross-sectional view of one embodiment of cookware according to the present invention.

FIG. 1. shows a cross-sectional view of one embodiment of cookware according to the present invention.

The cookware comprises a container (1), an inner cover (30), and an outer cover (50). The container (1) comprises an inner shell (2), and an outer shell (3), wherein a cavity (4) is provided between the inner shell (2) and the outer shell (3), and the inner shell (2) and the outer shell (3) form a joint (6) at an upper part of the container (1).

The joint (6) is made such that the inner shell (2) and the outer shell (3) are jointly rolled several times, and the joint is fixedly jointed by electrical welding.

In addition, a concave portion (7) is formed at an upper part of the inner shell (2), wherein the concave portion (7) forms moisture sealing to prevent vapor steam from leaking out.

Such moisture sealing prevents vitamin from escaping when the food's nutrients are leaked out.

A heat transfer medium (8) is provided within the cavity (4).

The heat transfer medium (8) is, preferably, silicon oil. Since silicon oil has an advantage for maintaining a melting point of −25° C. and a boiling point of 200° C., a heat preserving rate of 70% or more can be maintained even when the food has been preserved for a long time.

The heat transfer medium, preferably, occupies 55-90% of the cavity (4).

The heat transfer medium (8) is provided within the cavity (4) of the inner shell (2) and outer shell (3), so that the cookware according to the present invention is good for transferring heat during cooking and keeps the food warm for about four or more hours, and allows the food to be cooked automatically and slowly even when the heat source is removed.

A first heat transfer member (10) is inserted at a bottom portion of the cavity (4), and a second heat transfer member (12) is separately coupled to the outer surface of the first heat transfer member (10), and a protection cover (14) is provided covering the first and second heat transfer members.

The first heat transfer member (10) is, preferably, made of aluminum or copper and, preferably, has a thickness of 1.5-2.5 mm. Similarly, the second heat transfer member (12) is, preferably, made of aluminum or copper and, preferably, has a thickness of 2-4 mm.

An inner cover (30) comprises a dome-shaped inner container (32), and an inner handle that is attached to the center portion of the inner container (32), and an inner peripheral portion (36) is securely attached to the concave part (7) of the upper portion of the container (1).

The inner handle (34) may be made of a silicon rubber ring.

The inner body (32) is, preferably, made of tempered glass.

The inner peripheral portion (36) has an inverted L-shaped cross section whose inside bend is curved so as to be fitted with the concave portion (7) of the container (1), and it is, preferably, made of steel surrounded by silicon rubber.

Generally, food's flavor and vitamins of the food are lost when vapor steam is leaked out during cooking. However, according to the structure above, since the surface of the inner peripheral portion (36) is made of silicon rubber, the inner peripheral portion (36) and the concave portion (7) form a moisture sealing and the moisture sealing prevents vapor steam from leaking out during cooking.

In addition, the structure of the silicon rubber of the inner peripheral portion (36) of the inner cover (30) allows a secure sealing so that it can fully function as a pressure cooker.

On the inner cover (30), steam holes (38) may be formed on opposite positions when viewed from above. The steam holes prevent liquid food like soup from overflowing during cooking.

An outer cover (50) comprises a dome-shaped outer container (52), and an outer handle that is attached to the center portion of the outer container (52).

A cavity is provided between the inner cover (30) and the outer cover (50) so as to prevent releasing heat during cooking.

There are two covers: inner cover (30) and outer cover (50), so the cookware also functions as a semi-pressure cooker.

A pressure release device (60) is installed within a handle (61) attached to the outside of the container (1), and if a predetermined pressure is reached within the cavity (4), the pressure release device (60) operates to release the pressure.

Figure 2:
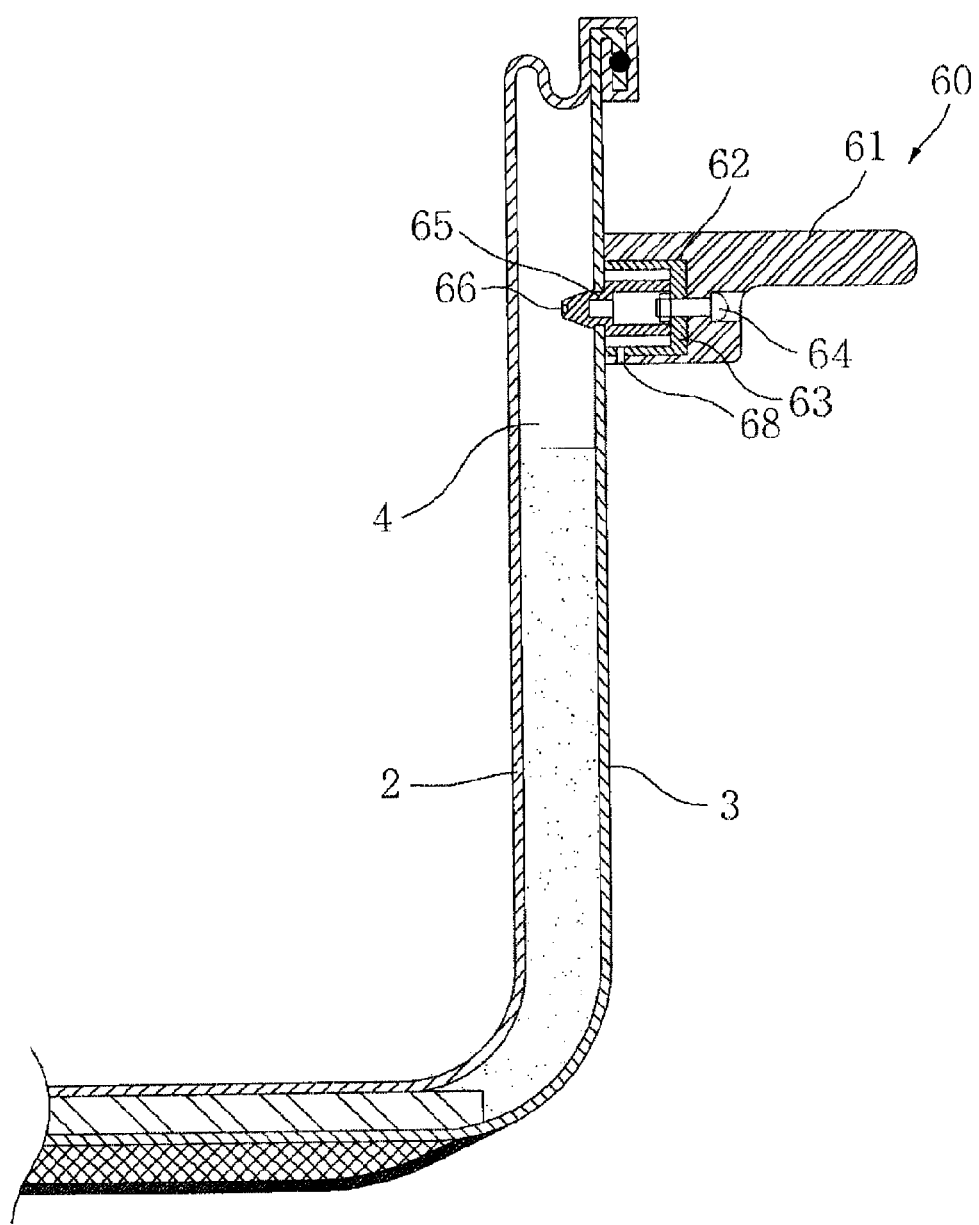
FIG. 2 shows a detailed view of a pressure release device according to the present invention.

FIG. 2 shows a detailed view of the pressure release device (60).

A bracket (63) is installed within a handle cavity (62) provided between the container's handle (61) and the outer shell (3), and this bracket (63) is affixed by a fixing part (64).

The fixing part (64) is preferably a screw.

Figure 3:
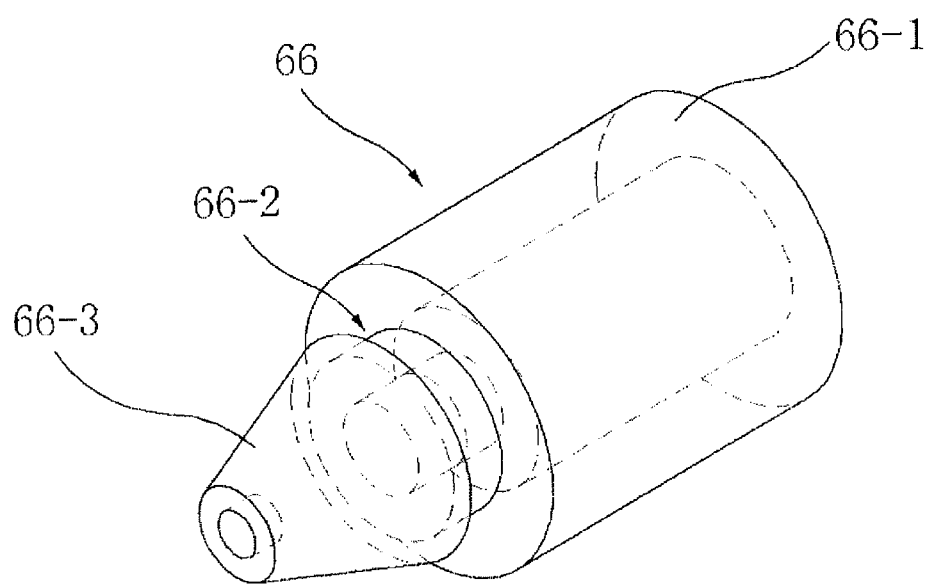
FIG. 3 shows a perspective view of a valve member of the pressure release device according to the present invention.

A valve member (66) is installed by inserting it into a hole formed on the outer shell (3) within the bracket (63). An exhaust hole (68) is formed at a bottom portion of the handle (61) to release air through downwardly. FIG. 3 shows a detailed view of a valve member (66) of the pressure release device (60).

The valve member (66) comprises a valve body (66-1), a valve neck (66-2), and a valve head (66-3), the valve body (66-1) being hollow and cylindrical, the valve head (66-3) being tapered forwardly, and the valve neck (66-2) being hollow and cylindrical with the smallest outer diameter and with its length being the same as the thickness of the outer shell (3).

As shown in FIG. 2, the valve neck (66-2) is inserted into the outer shell (3) at normal times, the valve head (66-3) is inserted into the cavity (4) of the double-layered wall, and an end of the valve body (66-1) is in contact with the bracket (63).

Figure 4:
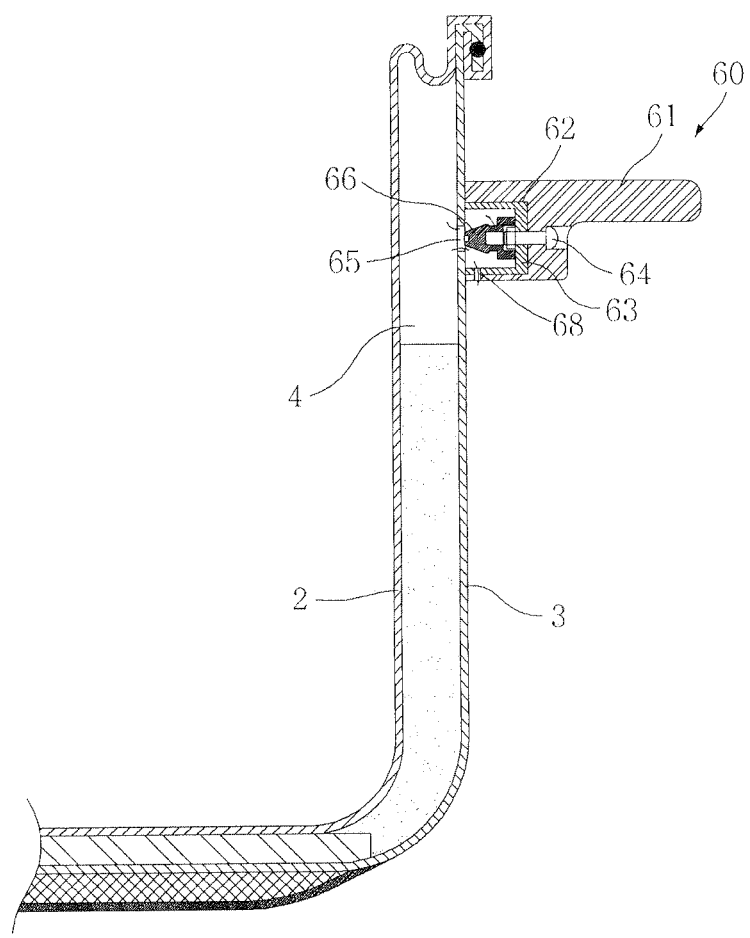
FIG. 4 shows an operational view of the pressure release device according to the present invention.

FIG. 4 shows an operational view of the pressure release device (60) according to the present invention.

If pressure within the cavity (4) increases and exceeds a predetermined level during cooking, a valve head (66-3) of the valve member (66) is pushed outside of the outer shell (3), thereby opening a hole (65) of the outer shell, and releasing pressure air through the hole (65) and releasing the air downwardly through the exhaust hole (68). When the pressure decreases, the valve member (66) returns to normal by its elastic property.

Figure 5:
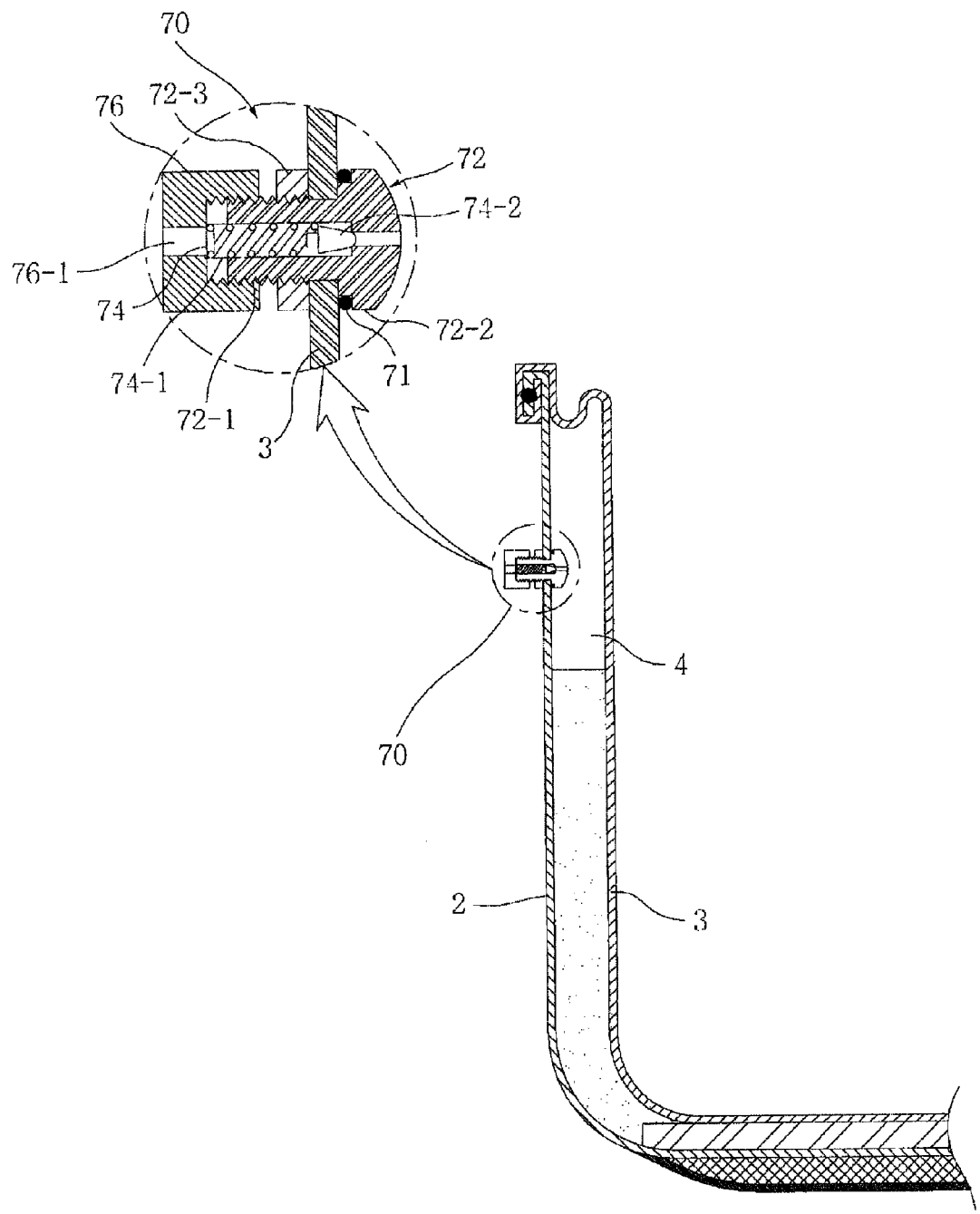
FIG. 5 shows a cross-sectional view of another embodiment of the pressure release device according to the present application.

FIG. 5 shows another embodiment of the pressure release device (70).

As another embodiment, a pressure release device (70) may be installed at a predetermined portion of the outer shell (3), separately from a handle.

The pressure release device (70) comprises a fixing member (72), an elastic member (74), and an elastic supporting member (76).

Referring to the enlarged view, the fixing member (72) comprises a fixing body (72-1), a fixing head (72-2), and a fixing nut (72-3), wherein the fixing member (72) is hollow, the diameter of a hollow portion of the fixing body (72-1) is greater than the diameter of a hollow portion of the fixing head (72-2), the fixing body (72-1) has a screw thread on a circumference thereof and is affixed to the fixing nut (72-3), and the fixing member (72) is affixed to a hole of the outer shell (3) and an O-ring (71) is inserted between the fixing head (72-2) and the outer shell (3) to secure the sealing.

An elastic member (74) is provided within the hollow portion of the fixing body (72-1) of the fixing member (72), and the elastic member (74) comprises an elastic body (74-1) for performing elastic action and an elastic head (74-2) for sealing the hollow portion of the fixing head (72-2) at normal times.

The elastic supporting member (76) is coupled to a screw of the fixing body (72-1) of the fixing member (72) and supports the elastic member (74), wherein a hole (76-1) is formed at one end to be a path through which air is released.

If the pressure within the cavity (4) of the container (1) increases, the elastic member (74) is pushed to the left of the drawing, so the head part (74-2) of the elastic member forms a path to release air so as to release the pressure within the cavity (4).

If the pressure decreases, it returns to its original position by the action of the elastic member (74).

The embodiments of the present invention described above are only for examples, but the present invention is not limited to these embodiments. Various other changes and modifications can be made without departing from the spirit and scope of the invention. The present invention is not limited by the description described above, but only limited by the scope of the claims attached herewith.

REFERENCE NUMERICAL NUMBERS

1: container
2: inner shell
3: outer shell
4: cavity
6: joint
7: concave portion
8: heat transfer medium
10: first heat transfer member
12: second heat transfer member
30: inner cover
38: steam hole
50: outer cover
60: pressure release device
66: valve member
70: pressure release device
72: fixing member
74: elastic member
76: elastic supporting member

What is claimed is:

1. A cookware having a double-layered wall structure, comprising:
  a container comprising an inner shell (2) and an outer shell (3), wherein a cavity (4) is provided between said inner shell (2) and said outer shell (3), wherein upper parts of the inner shell and outer shell are rolled a predetermined number of times together to form a rolled joint (6), wherein an upper part of the inner shell (2) is provided with a concave member (7), wherein a heat transfer medium (8) is provided within said cavity (4), wherein a first heat transfer member (10) is inserted and installed at the bottom portion of said cavity (4), and wherein a second heat transfer member (12) is affixed to the bottom surface of the first heat transfer member (10);
  an inner cover (30) for covering the upper surface of the concave portion of said inner shell;
  an inner peripheral portion (36) provided along an edge of the inner cover (30) in the form of an inverted "L" whose inside bend forms a round portion, wherein the inner peripheral portion is made of steel material surrounded by an elastic lining material, and forms moisture sealing such that the cookware functions as a low pressure cooker and prevents vitamin loss in cooking;
  an outer cover (50) positioned above said inner cover (30); and
  pressure release devices (60, 70) for releasing the pressure within said cavity (4) when a pressure within said cavity (4) gets larger than a predetermined reference pressure; and
  steam holes (38) formed on said inner cover (30) for releasing pressure built up the container (1) and liquid overflow from below to a gap between the inner cover (30) and the outer cover (50),
  wherein there is a downward slope from the steam holes (38) to the edge of the inner cover (30) so that, during cooking, steam gets out of the steam holes, condenses into water, and flows to the concave member to form the moisture sealing for preventing vapor steam from leaking out;
  wherein the elastic lining material expands during cooking so that increased adhesion and friction between the elastic lining material and the inner shell prevents the inner cover from opening when the container is pressurized during cooking.

2. The cookware according to claim 1, wherein said heat transfer medium (8) is silicon oil.

3. The cookware according to claim 1, wherein said first heat transfer member (10) and said second heat transfer member (12) are made of aluminum or copper.

4. The cookware according to claim 1, wherein said pressure release device (60) comprises a valve member (66) with an elastic property, said valve member comprising a valve body (66-1) in the form of a hollow cylinder, a valve neck (66-2), and a valve head (66-3), said valve neck (66-2) extending to said valve body (66-1) and having a smaller diameter than the valve body (66-1), and said valve head (66-3) tapered forwardly, wherein said valve neck (66-2) is inserted into a hole (65) of an outer shell (3) of said container (1).

5. The cookware according to claim 1, wherein said pressure release device (70) comprises a fixing member (72), an elastic member (74), and an elastic supporting member (76), said fixing member (72) comprising a fixing body (72-1), a fixing head (72-2), and a fixing nut (72-3), said fixing member (72) being hollow, wherein a hollow portion of said fixing body (72-1) has a greater diameter than a hollow portion of said fixing head part (72-2), and wherein said elastic member (74) is provided within the hollow portion of said fixing body (72-1), said elastic member (74) comprising an elastic body (74-1) for performing elastic action and an elastic head (74-2) for sealing the hollow portion of said fixing head part (72-2) at normal times, and said elastic supporting member (76) being coupled to a screw of said fixing body (72-1) of said fixing member (72) and supporting said elastic member (74), and having a hole at one end.

6. The cookware according to claim 1, wherein the elastic lining material comprises a silicon rubber.

7. The cookware according to claim 1, wherein the rolled joint (6) is made by performing seamless electrical welding on edges of the inner shell (2) and the outer shell (3).

8. The cookware according to claim 5, wherein the elastic body (74-1) is in a shape of a screw, and the elastic head (74-2) comprises a needle valve which is made of heat resistant rubber;

wherein the fixing head (72-2) is placed in an inner space of the outer shell (2), and the fixing nut (72-3) is made of heat resistant material;

wherein the fixing member (72) is securely affixed to the outer shell (2) by the fixing nut (72-3) engaged with external threads of the fixing body (72-1);

wherein the elastic supporting member (76) has internal threads engaged with the external threads of the fixing body (72-1); and wherein the elastic member (74) biases the elastic head (74-2) against the hole (76-1) and any excessive pressure generated from the cavity (4) is released through the pressure release device (70) and through the hole (76-1) by elastic movement of the elastic head (74-2) when sufficient pressure is created in the cavity (4).

* * * * *